(12) United States Patent
Morgan et al.

(10) Patent No.: US 8,776,635 B2
(45) Date of Patent: Jul. 15, 2014

(54) COMPOSITE FLYWHEEL

(75) Inventors: Frederick E. Morgan, Coral Springs, FL (US); Christopher V. Barone, Davie, FL (US); Jeffrey Strohecker, Coconut Creek, FL (US)

(73) Assignee: Power Tree Corp., Miami, FL (US)

( * ) Notice: Subject to any disclaimer, the term of this patent is extended or adjusted under 35 U.S.C. 154(b) by 0 days.

(21) Appl. No.: 13/230,399

(22) Filed: Sep. 12, 2011

(65) Prior Publication Data
US 2012/0060644 A1 Mar. 15, 2012

Related U.S. Application Data

(60) Provisional application No. 61/382,694, filed on Sep. 14, 2010.

(51) Int. Cl.
*H02K 7/02* (2006.01)
*F16F 15/30* (2006.01)
*F16F 15/305* (2006.01)

(52) U.S. Cl.
CPC .................. *F16F 15/30* (2013.01); *F16F 15/305* (2013.01)
USPC ............ 74/572.12; 74/574.4; 74/572.21; 156/330; 156/306.6; 156/60

(58) Field of Classification Search
CPC ............................. F16F 15/30; F16F 15/305
USPC ............ 74/433.5, 572.1, 572, 11, 572.12, 74/572.2, 572.21, 574.4; 156/171, 173, 156/175; 29/894; 428/66.6
See application file for complete search history.

(56) References Cited

U.S. PATENT DOCUMENTS

| | | | |
|---|---|---|---|
| 3,208,303 A | | 9/1965 | Durouchoux |
| 3,296,886 A | * | 1/1967 | Reinhart, Jr. ............... 74/572.21 |
| 3,683,216 A | | 8/1972 | Post |
| 3,722,550 A | * | 3/1973 | Matthews ..................... 138/137 |
| 3,788,162 A | * | 1/1974 | Rabenhorst et al. ........ 74/572.12 |
| 3,859,868 A | * | 1/1975 | Post ............................ 74/572.12 |
| 4,020,714 A | * | 5/1977 | Rabenhorst ................. 74/572.12 |
| 4,023,437 A | | 5/1977 | Rabenhorst |
| 4,098,142 A | * | 7/1978 | Weyler, Jr. ................. 74/572.12 |
| 4,112,785 A | | 9/1978 | Brobeck |
| 4,153,747 A | | 5/1979 | Young et al. |
| 4,183,259 A | | 1/1980 | Giovachini et al. |
| 4,186,245 A | * | 1/1980 | Gilman ........................ 428/635 |
| 4,190,626 A | | 2/1980 | Weyler, Jr. |

(Continued)

FOREIGN PATENT DOCUMENTS

| | | |
|---|---|---|
| CN | 101800450 | 8/2010 |
| DE | 10 2004 002 456 A1 | 8/2005 |

(Continued)

OTHER PUBLICATIONS

English Abstract of JP 2007-129797, Tetsuo et al., May 2007.*

(Continued)

*Primary Examiner* — Vinh Luong
(74) *Attorney, Agent, or Firm* — Hamilton, Brook, Smith & Reynolds, PC

(57) ABSTRACT

A flywheel includes a wheel having a composite rim structure with multiple radial layers of steel material. Epoxy type adhesive can bond the multiple layers of stainless steel together.

14 Claims, 9 Drawing Sheets

(56) References Cited

U.S. PATENT DOCUMENTS

| | | | |
|---|---|---|---|
| 4,198,878 A * | 4/1980 | Lewis et al. | 74/572.12 |
| 4,359,912 A | 11/1982 | Small | |
| 4,412,170 A | 10/1983 | Roesel, Jr. | |
| 4,413,860 A | 11/1983 | Prescott | |
| 4,421,827 A | 12/1983 | Phillips | |
| 4,423,794 A | 1/1984 | Beck | |
| 4,507,983 A * | 4/1985 | Kiss | 74/572.11 |
| 4,638,173 A | 1/1987 | Milton | |
| 4,765,198 A * | 8/1988 | Stravrinidis | 74/572.11 |
| 4,793,886 A | 12/1988 | Okamura et al. | |
| 4,950,701 A | 8/1990 | Okamura et al. | |
| 4,991,462 A | 2/1991 | Breslich, Jr. et al. | |
| 5,071,687 A * | 12/1991 | Shigetoh | 428/35.9 |
| 5,187,005 A | 2/1993 | Stahle et al. | |
| 5,285,699 A * | 2/1994 | Walls et al. | 74/572.12 |
| 5,452,625 A | 9/1995 | Nardone et al. | |
| 5,614,777 A | 3/1997 | Bitterly et al. | |
| 5,635,770 A | 6/1997 | Evans, Jr. et al. | |
| 5,692,414 A * | 12/1997 | Gregoire | 74/572.12 |
| 5,695,584 A | 12/1997 | Gregoire | |
| 5,702,795 A * | 12/1997 | Matsumoto et al. | 428/66.6 |
| 5,763,079 A | 6/1998 | Hanusiak et al. | |
| 5,767,595 A | 6/1998 | Rosen | |
| 5,778,735 A | 7/1998 | Groves | |
| 5,902,443 A | 5/1999 | Kanakubo et al. | |
| 5,924,335 A | 7/1999 | Kuklo | |
| 5,936,375 A | 8/1999 | Enoki | |
| 6,029,350 A * | 2/2000 | Maass et al. | 29/894 |
| 6,138,527 A | 10/2000 | Bitterly et al. | |
| 6,325,142 B1 | 12/2001 | Bosley et al. | |
| 6,347,925 B1 | 2/2002 | Woodard et al. | |
| 6,583,528 B2 | 6/2003 | Gabrys | |
| 6,614,132 B2 | 9/2003 | Hockney et al. | |
| 6,639,370 B1 | 10/2003 | Gabrys | |
| 6,675,872 B2 | 1/2004 | Lewis et al. | |
| 6,722,228 B1 * | 4/2004 | Wilkinson et al. | 74/572.12 |
| 6,741,007 B2 | 5/2004 | Frash et al. | |
| 6,747,378 B2 | 6/2004 | Brackett | |
| 6,794,777 B1 | 9/2004 | Fradella | |
| 6,817,266 B1 | 11/2004 | Brackett | |
| 6,824,861 B2 * | 11/2004 | Spears | 428/293.1 |
| 6,852,401 B2 | 2/2005 | Spears et al. | |
| 6,868,753 B2 | 3/2005 | Tsai | |
| 6,884,039 B2 | 4/2005 | Woodard et al. | |
| 6,959,756 B2 | 11/2005 | Woodard et al. | |
| 6,995,529 B2 | 2/2006 | Sibley | |
| 7,034,420 B2 | 4/2006 | Brackett et al. | |
| 7,068,014 B2 | 6/2006 | Gabrys | |
| 7,080,573 B2 | 7/2006 | Detore et al. | |
| 7,144,468 B2 | 12/2006 | Decristofaro et al. | |
| 7,174,806 B2 | 2/2007 | Brackett et al. | |
| 7,219,578 B2 | 5/2007 | Hada et al. | |
| 7,238,407 B2 | 7/2007 | Wesch et al. | |
| 7,267,028 B2 | 9/2007 | Gabrys | |
| 7,270,007 B2 | 9/2007 | Serrano | |
| 7,294,384 B2 | 11/2007 | Eleazer et al. | |
| 7,300,691 B2 | 11/2007 | Callaway et al. | |
| 7,365,461 B2 | 4/2008 | Brackett et al. | |
| 7,466,430 B2 | 12/2008 | Braghiroli | |
| 7,887,660 B2 * | 2/2011 | Jeruzal et al. | 156/188 |
| 8,328,138 B2 * | 12/2012 | Bergmann et al. | 244/131 |
| 2002/0083791 A1 | 7/2002 | Detore et al. | |
| 2003/0000336 A1* | 1/2003 | Tsai | 74/572 |
| 2003/0029600 A1 | 2/2003 | Woodard et al. | |
| 2003/0101844 A1* | 6/2003 | Gabrys | 74/572 |
| 2004/0067705 A1 | 4/2004 | Ton-That et al. | |
| 2004/0105949 A1 | 6/2004 | Krause | |
| 2004/0191441 A1 | 9/2004 | Bureau et al. | |
| 2005/0150323 A1 | 7/2005 | Spears | |
| 2005/0155450 A1* | 7/2005 | Jennings | 74/572.12 |
| 2006/0094833 A1 | 5/2006 | McDonnell et al. | |
| 2006/0117904 A1 | 6/2006 | Brackett et al. | |
| 2006/0212272 A1 | 9/2006 | James | |
| 2006/0260898 A1 | 11/2006 | Tsuruta et al. | |
| 2007/0014980 A1 | 1/2007 | Spears | |
| 2007/0103108 A1 | 5/2007 | Capp et al. | |
| 2007/0113759 A1 | 5/2007 | Roth et al. | |
| 2007/0137784 A1 | 6/2007 | McDonnell et al. | |
| 2007/0238379 A1 | 10/2007 | Bhatnagar et al. | |
| 2007/0255189 A1 | 11/2007 | Halanski et al. | |
| 2008/0058445 A1 | 3/2008 | Dry | |
| 2008/0215727 A1 | 9/2008 | Denis et al. | |
| 2008/0303679 A1 | 12/2008 | Vrla et al. | |
| 2009/0036566 A1 | 2/2009 | Li et al. | |
| 2009/0104386 A1 | 4/2009 | Barrera et al. | |
| 2009/0198012 A1 * | 8/2009 | Sakata et al. | 524/606 |
| 2009/0211660 A1* | 8/2009 | Johnson et al. | 138/126 |
| 2009/0218537 A1* | 9/2009 | Soroushian et al. | 252/62.2 |
| 2010/0083790 A1 | 4/2010 | Graney et al. | |
| 2010/0119836 A1 * | 5/2010 | Naritomi et al. | 428/416 |
| 2010/0206126 A1 * | 8/2010 | Spears et al. | 74/572.12 |
| 2010/0233490 A1 * | 9/2010 | Morishita et al. | 428/425.8 |
| 2011/0023636 A1 | 2/2011 | Atkins et al. | |
| 2012/0062154 A1* | 3/2012 | Chiao et al. | 318/161 |

FOREIGN PATENT DOCUMENTS

| | | | | |
|---|---|---|---|---|
| EP | 0 056 713 | A2 | 7/1982 | |
| EP | 1 199 493 | A2 | 4/2002 | |
| EP | 2 053 078 | A1 | 4/2009 | |
| FR | 2 663 369 | A1 | 12/1991 | |
| GB | 2463685 | A * | 3/2010 | F16F 15/30 |
| JP | 58-075496 | | 5/1983 | |
| JP | 59-74176 | | 4/1984 | |
| JP | 2006-046070 | | 2/2006 | |
| JP | 2007-129797 | * | 5/2007 | H02K 7/02 |
| KR | 2006-0003762 | | 7/2004 | |
| SU | 1 649 170 | | 5/1991 | |
| WO | WO 99/32762 | A1 | 7/1999 | |
| WO | WO 02/29278 | A1 | 4/2002 | |
| WO | WO 2010/042426 | A2 | 4/2010 | |

OTHER PUBLICATIONS

Notification of Transmittal of the International Search Report and the Written Opinion of the International Searching Authority, for PCT/US2011/051216, date of mailing Jan. 18, 2012.
*Federal Technology Alert*, pp. 2-4, FEMP, www.eere.energy.gov/femp, Sep. 2003, Article.
"Flywheel Facts and Fallacies", http://regen.0catch.com/facts.htm, pp. 1-5, Feb. 13, 2009, Article.
"Flywheels", http://www.wtec.org/loyola/scpa/04__02.htm, pp. 1-6, Mar. 12, 2009. Article.
"Inventors seek to reinvent the (fly)wheel for buses", https ://www.entrepreneur.com/tradejournals/article/print/12501464.html, Entrepreneur Media, Inc., Jun. 15, 1992. Article.
"Sidebar: Building a Better Flywheel", http://ecmweb.com/mag/electric_energy_uninterrupted//, Jan. 14, 2009. Article.
Hardan, F., et al., "Bi-directional power control for flywheel energy storage system with vector-controlled induction machine drive", Seventh International Conference on Power Electronics and Variable Speed Drives. Institution of Engineering and Technology, 2009. Abstract.
Powercorp—PowerStore http://www.pcorp.com.au/index.php?option=com_content&task=view&id=83&Itemid=132, Mar. 6, 2009, Webpage.
Powercorp, Power Store—The PowerStore System, www.pcorp.com.au, pp. 1-4, Mar. 3, 2006.
Powercorp Alaska: Power Quality, http://www.pcorpalaska.com/powerquality1.shtml, Mar. 6, 2009. Webpage.
Powercorp—About Us http://www.pcorp.com.au/index.php?option=com_content&task=view&id=98&Itemid=156, Mar. 6, 2009. Webpage.
Powercorp—Products and Capabilities http://www.pcorp.com.au/index.php?option=com_content&task=view&id=119 &Itemid=171, Mar. 6, 2009. Webpage.
Powercorp Alaska: Power Quality, http://www.pcorpalaska.com/powerquality2.shtml,Mar. 6, 2009. Webpage.
Powercorp Alaska: Power Quality, http://www.pcorpalaska.com/powerquality3.shtml,Mar. 6, 2009. Webpage.

(56) References Cited

OTHER PUBLICATIONS

Powercorp Alaska: Automation, http://www.pcorpalaska.com/automation.shtml, Mar. 9, 2009. Webpage.

Powercorp Alaska: Commander Overview, http://www.pcorpalaska.com/automation1.shtml, Mar. 9, 2009, Webpage.

Powercorp Alaska: Microlink Overview, http://www.pcorpalaska.com/automation6.shtml, Mar. 9, 2009, Webpage.

Werst, M., "Advanced Rotating Machines," Presentation, The University of Texas at Austin Center for Electromechanics (Apr. 27, 2010).

ActivePower "Understanding Flywheel Energy Storage: Does High-Speed Really Imply a Better Design?," White Paper 112 (2008).

* cited by examiner

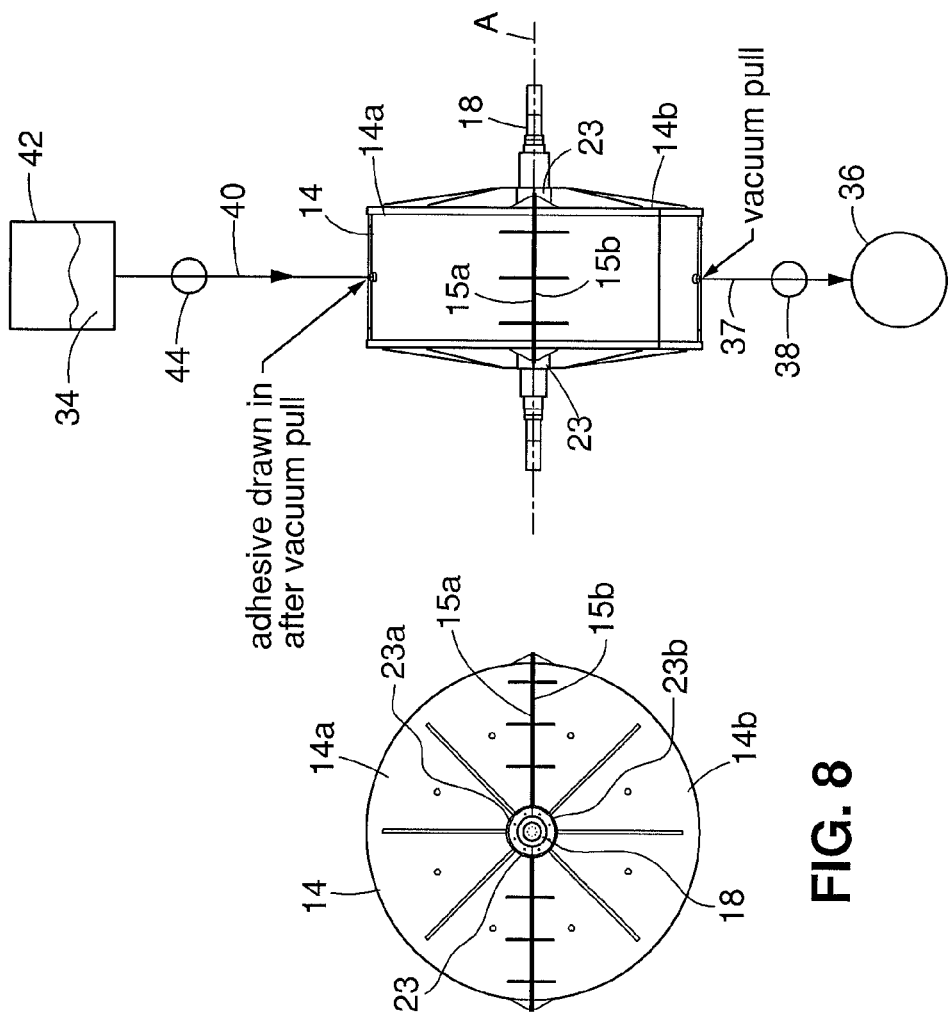
FIG. 8
FIG. 9
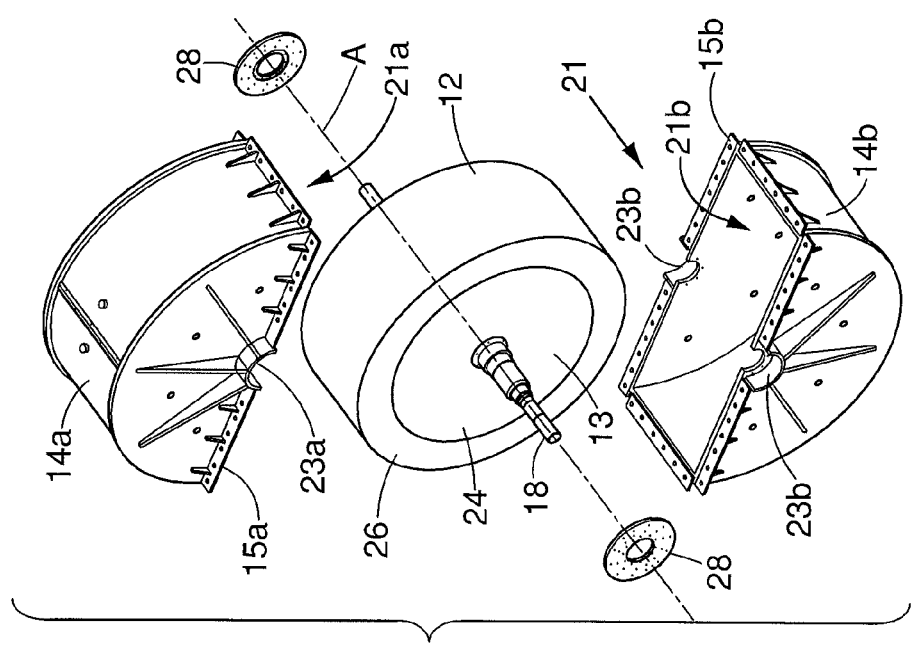
FIG. 7

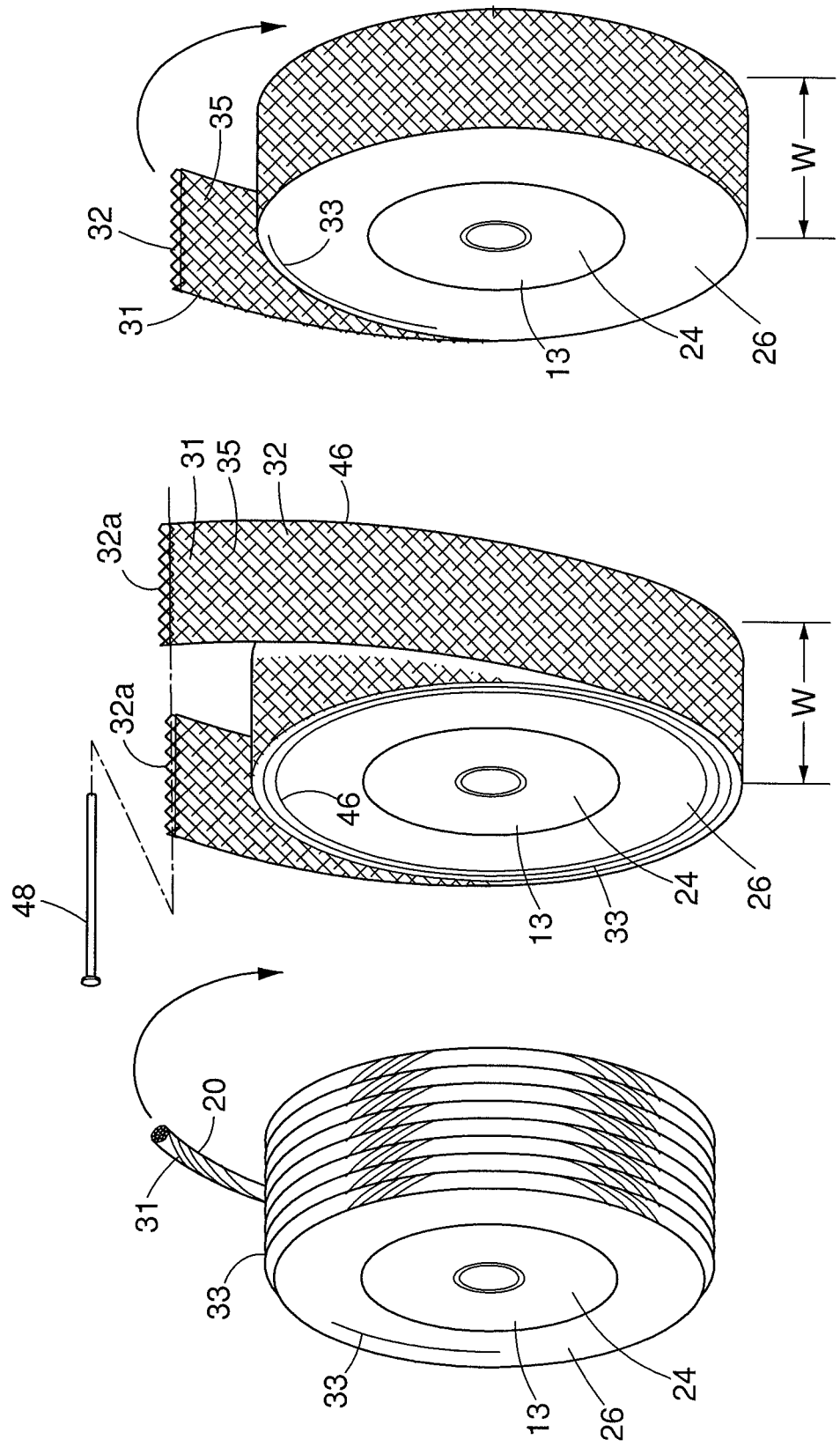

COMPOSITE FLYWHEEL

RELATED APPLICATION

This application claims the benefit of U.S. Provisional Application No. 61/382,694, filed on Sep. 14, 2010. The entire teachings of the above application are incorporated herein by reference.

BACKGROUND

Composite flywheels can include fibers, or filaments that are wound into a wheel and bonded together with adhesives. Such fibers can be metallic wires. The size, or speed of composite flywheels having metallic wires is typically limited to being relatively small, so that the wires and adhesive do not delaminate from each other.

SUMMARY

The present invention can provide a flywheel that can be made larger and heavier, and rotated at higher speeds than prior composite flywheels. The flywheel can include a wheel having a composite rim structure with multiple radial layers of stainless steel material. Epoxy type adhesive can bond the multiple layers of stainless steel together.

In particular embodiments, the radial layers of stainless steel material can have a series of cavities. In some embodiments, the stainless steel material can include a length of stainless steel fibers. The epoxy type adhesive can be vacuum impregnated into spaces between the stainless steel fibers and the radial layers of the stainless steel material. In one embodiment, the stainless steel material can include stainless steel wire rope. In another embodiment, the stainless steel material can include a web of stainless steel braided wire. In another embodiment, the stainless steel material can include a web of stainless steel mesh. The composite rim structure can be positioned around an outer perimeter of a core member. The core member can be mounted on a central shaft. In one embodiment, the composite rim structure can have a series of discrete concentric annular rings of stainless steel material. In another embodiment, the composite rim structure can have a continuous spiral wound length of stainless steel material. In other embodiments, multiple radial layers of nonmetallic fiber material can be included and positioned such that adjacent radial layers of stainless steel material have a layer of the nonmetallic fiber material bonded therebetween. The nonmetallic fiber material can be formed of carbon.

The present invention can also provide a flywheel including a wheel having a composite rim structure. The composite rim structure can have multiple radial layers of porous steel web material and multiple radial layers of porous nonmetallic fiber web material, forming alternating radial layers of porous steel web material and porous nonmetallic fiber web material. An adhesive can bond the alternating radial layers of porous steel web material and porous nonmetallic fiber web material together.

In particular embodiments, the porous steel web material and the porous nonmetallic fiber web material are wound from continuous lengths into a bilayer spiral configuration. The porous steel web material can be formed from alloy steel, which in some embodiments is stainless steel. The porous nonmetallic fiber web material can be formed of carbon. The porous steel web material can be in mesh form, and the porous nonmetallic fiber web material can be in cloth form. A metallic core member can be included and have an outer perimeter around which the composite rim structure is positioned.

The present invention can also provide a flywheel including a wheel having a composite rim structure with multiple radial layers of surface treated steel material. An adhesive can bond the multiple radial layers of surface treated steel material together.

In particular embodiments, surfaces of the steel can be treated to remove rust and/or oil. In addition, surfaces of the steel can be treated to increase surface area bonding with the adhesive. In some embodiments, surfaces of the steel can be treated with a rust inhibiting protective coating.

The present invention can also provide a method of forming a flywheel including forming multiple radial layers of stainless steel material into a wheel. The multiple radial layers of stainless steel material can be bonded together with epoxy type adhesive to form a composite rim structure of the wheel.

In particular embodiments, the radial layers of stainless steel material can be provided with a series of cavities. In some embodiments, the stainless steel material can be provided with a length of stainless steel fibers. The epoxy type adhesive can be vacuum impregnated into spaces between the stainless steel fibers and the radial layers of the stainless steel material. In one embodiment, the stainless steel material can be stainless steel wire rope. In another embodiment, the stainless steel material can be a web of stainless steel braided wire. In another embodiment, the stainless steel material can be a web of stainless steel mesh. The composite rim structure can be positioned around an outer perimeter of a core member. The core member can be mounted on a central shaft. In one embodiment, the composite rim structure can be formed with a series of discrete concentric annular rings of stainless steel material. In another embodiment, the composite rim structure can be formed with a continuous spiral wound length of stainless steel material. In other embodiments, the composite rim structure can include multiple radial layers of nonmetallic fiber material positioned so that adjacent radial layers of stainless steel material have a layer of the nonmetallic fiber bonded therebetween. The radial layers of nonmetallic fiber material can be formed from carbon.

The present invention can also provide a method of forming a flywheel including forming multiple radial layers of porous steel web material and multiple radial layers of porous nonmetallic fiber web material into a wheel, with alternating radial layers of porous steel web material and porous nonmetallic fiber web material. The multiple radial layers of porous steel web material and multiple radial layers of porous nonmetallic fiber web material can be bonded together with an adhesive to form a composite rim structure of the wheel.

In particular embodiments, the porous steel web material and the porous nonmetallic fiber web material can be wound from continuous lengths into a bilayer spiral configuration. The porous steel web material can be formed from alloy steel, which in some embodiments, can be stainless steel. The porous nonmetallic fiber web material can be formed from carbon. The porous steel web material can be in mesh form and the porous nonmetallic fiber web material can be in cloth form. The composite rim structure can be positioned around an outer perimeter of a metallic core member.

The present invention can also provide a method of forming a flywheel including forming multiple radial layers of surface treated steel material into a wheel. The multiple radial layers of surface treated steel material can be bonded together with an adhesive to form a composite rim structure of the wheel.

In particular embodiments, surfaces of the steel can be treated to remove rust and/or oil. In addition, surfaces of the steel can be treated to increase surface area for bonding with the adhesive. In some embodiments, surfaces of the steel can be treated with a rust inhibiting protective coating.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 7 is an exploded perspective view of a flywheel being loaded within an embodiment of a vacuum chamber housing or enclosure in the present invention.

FIG. 8 is a front view of the flywheel loaded within the vacuum enclosure.

FIG. 9 is a side view of the flywheel loaded within the vacuum enclosure and connected to a vacuum pump and a reservoir of adhesive.

FIG. 16 is a schematic perspective view of an embodiment of forming a flywheel in the present invention having wound wire rope.

FIG. 17 is a schematic perspective view of another embodiment of forming a flywheel in the present invention having concentric annular rings of mesh.

FIG. 18 is a schematic perspective view of yet another embodiment of forming a flywheel in the present invention having wound mesh.

DETAILED DESCRIPTION

A description of example embodiments of the invention follows.

Figure 1:
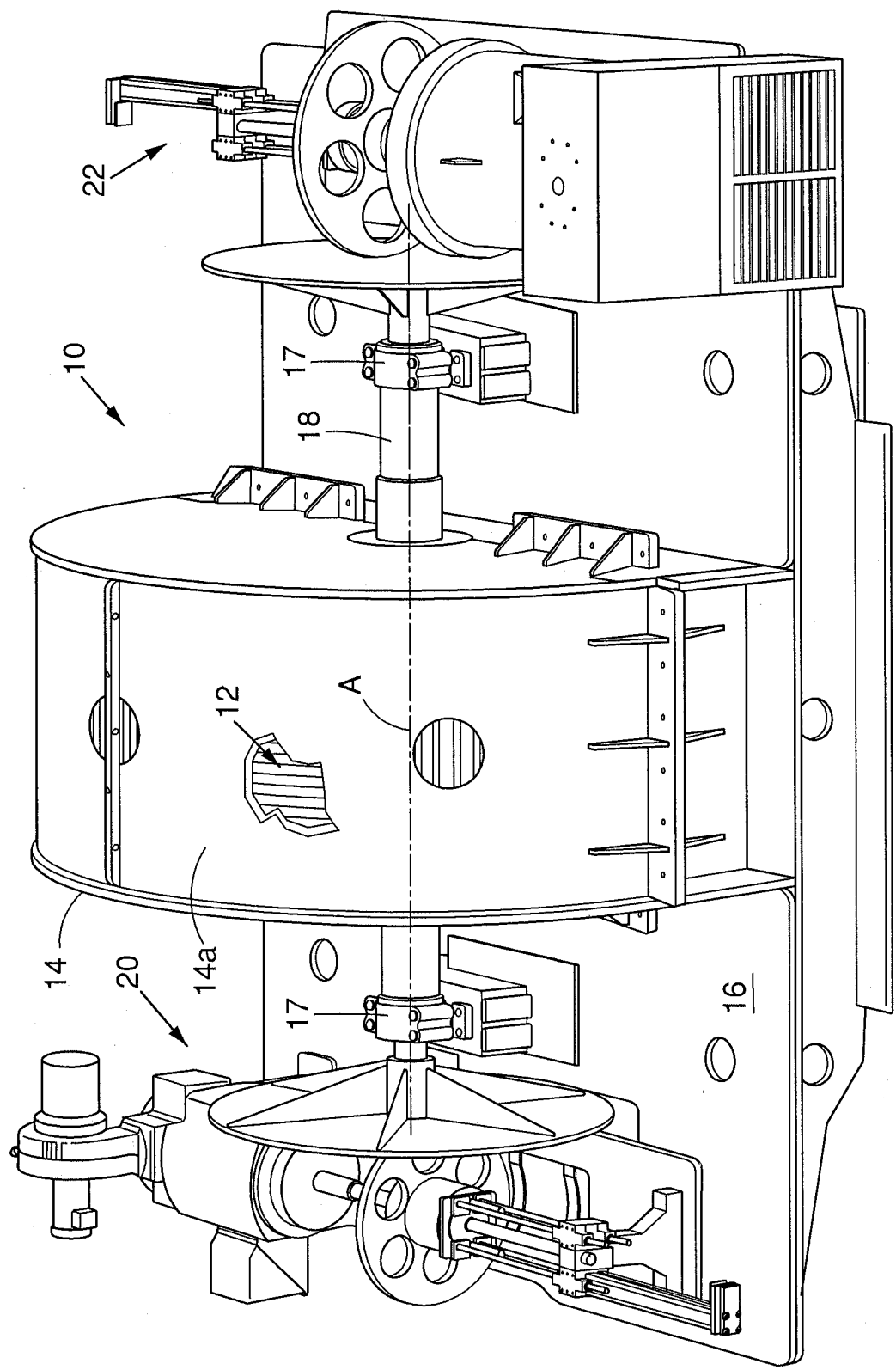
FIG. 1 is a perspective view of an embodiment of a flywheel system in the present invention.
Figure 2:
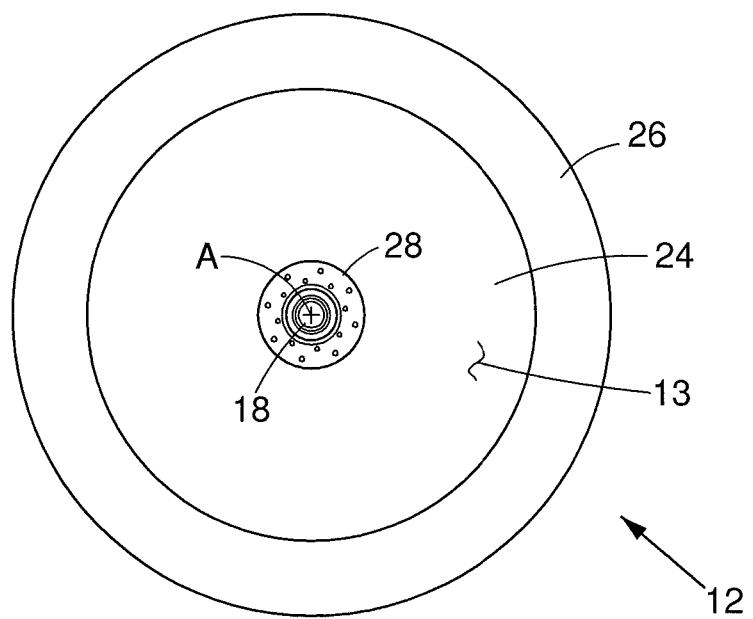
FIG. 2 is a front view of an embodiment of a flywheel in the present invention.
Figure 3:
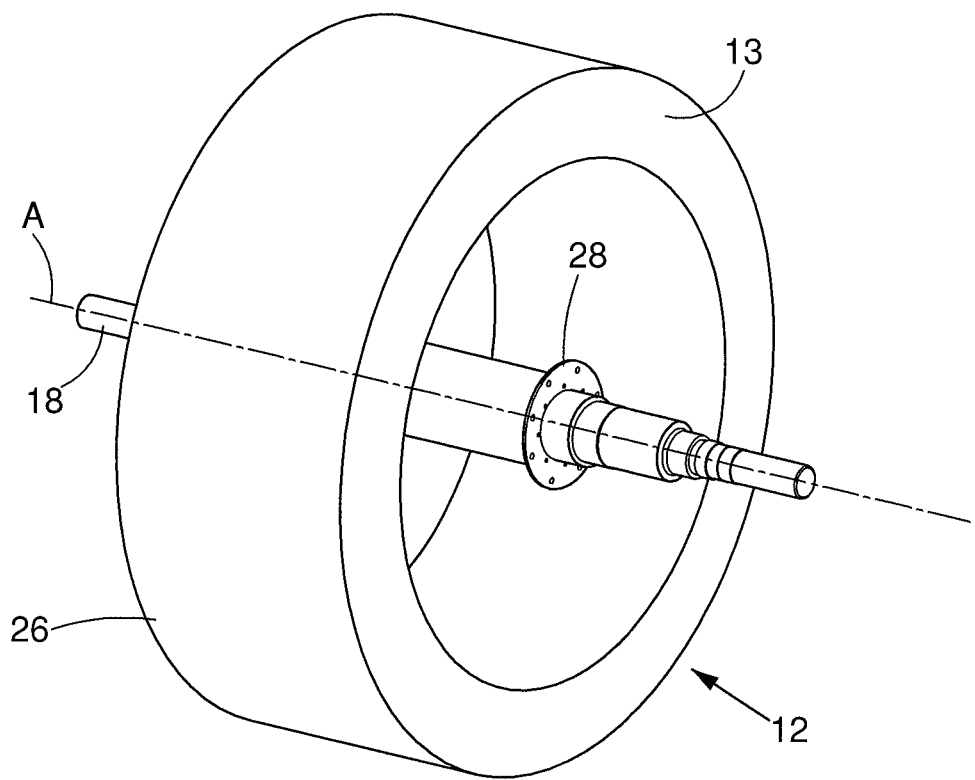
FIG. 3 is a perspective view of the flywheel of FIG. 2 with the core omitted.

Referring to FIG. 1, an embodiment of a flywheel system or device 10 includes a flywheel 12, which can be formed of composite materials. The flywheel 12 can rotate about a lateral or horizontal support or drive shaft 18 having a longitudinal axis A, that is supported by bearings 17, and can be contained within a housing, chamber or enclosure 14. The interior of the housing 14 can have a vacuum to reduce wind resistance on the flywheel 12. The housing 14 and bearings 17 can be supported or mounted on a support frame, base or platform 16. A drive unit 20 can be rotatably connected to one end of the shaft 18 for driving the flywheel 12 up to a desired speed. The drive unit 20 can have an electric motor which can be rotated up to a desired speed, and a variable speed transmission. A generator unit 22 can be rotatably connected to the shaft 18 on the opposite end of shaft 18 for generating electricity from the rotation of the flywheel 12. The flywheel 12 can be brought up to a desired rotational speed to store energy, which can be converted to electricity when desired, by generator unit 22. The generator unit 22 can include a generator that is driven by a variable speed transmission. The variable speed transmission can allow the generator to be rotated at a desired constant rotational speed even while flywheel 12 changes or loses speed. Rotating the generator at a constant speed can provide a constant electrical power output, which can be desirable. The generator can be a DC or AC generator, and when the generator is an AC generator, the generator can be rotated at a constant rotational speed, for example 1800 RPM for producing electrical power having a frequency of 60 Hertz. In some embodiments, 1500 RPM can be suitable for 50 hertz. The flywheel 12 can be rotated above about 1000 RPM, for example in some embodiments, in the range of about 3000 RPM to about 6000 RPM, and other embodiments, up to about 10,000 RPM.

Referring to FIGS. 2-6, the flywheel 12 can include an inner core or core member 24 secured or mounted to or around the shaft 18, and an outer composite rim structure 26 secured, formed or mounted around the core 24. The core 24 can be secured to the shaft 18 by two clamp securement members, plates or flanges 28 that are on opposite sides or faces 13 of the core 24 and flywheel 12. The plates 28 can be secured to the core 24 and to shoulders on shaft 18 with threaded members such as threaded rods, bolts, nuts, etc. In some embodiments, other suitable securement methods can be employed. In some embodiments, the core 24 can be formed of polymeric or composite materials. In one embodiment, the core 24 can be formed of woven strap, ribbon, web, fiber, filament or rope material 24a, wound or wrapped, and bonded together with adhesives, glues or resins 34. The adhesives 34 can be an epoxy type adhesive and can fill the voids, cavities, recesses or spaces 25 in the core 24. In some embodiments, the adhesive can be the same adhesive 34 used for rim 26. The material 24a can be secured to shaft 18, such as with adhesives, glue, or resin 34 and wound under tension to the desired diameter, and secured in place, such as with adhesives, glue or resin 34. The material 24a can be woven polyester or nylon. In one embodiment, ½ inch diameter nylon rope can be used. In other embodiments, the material 24a can be a flat web having the same width of the flywheel 12.

In some embodiments, the core 24 can be formed of a suitable metal, which can included stainless steel, various other steels, titanium, etc., that can be machined to be round, concentric and balanced. Such a metallic core can include mechanical features or fasteners for securement to the outer composite rim structure 26. A concentric and balanced metal core 24 can allow the formation of the outer rim 26 to be formed in a manner that can allow the flywheel 12 to be more easily balanced. The metal core 24 can be easily machined to be concentric, and does not become misshapen during the formation of the outer rim 26 thereon, which can sometimes occur when core 24 is formed of some composite materials.

Figure 6:
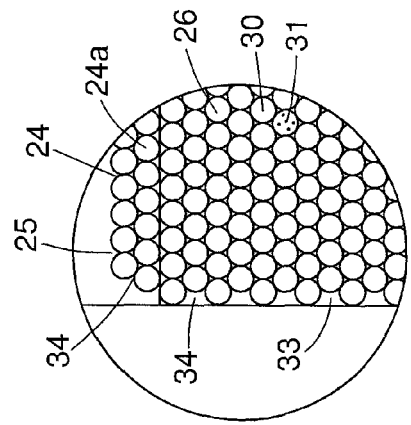
FIG. 6 is an enlarged view of a portion indicated by reference numeral 6 in FIG. 5.
Figure 5:
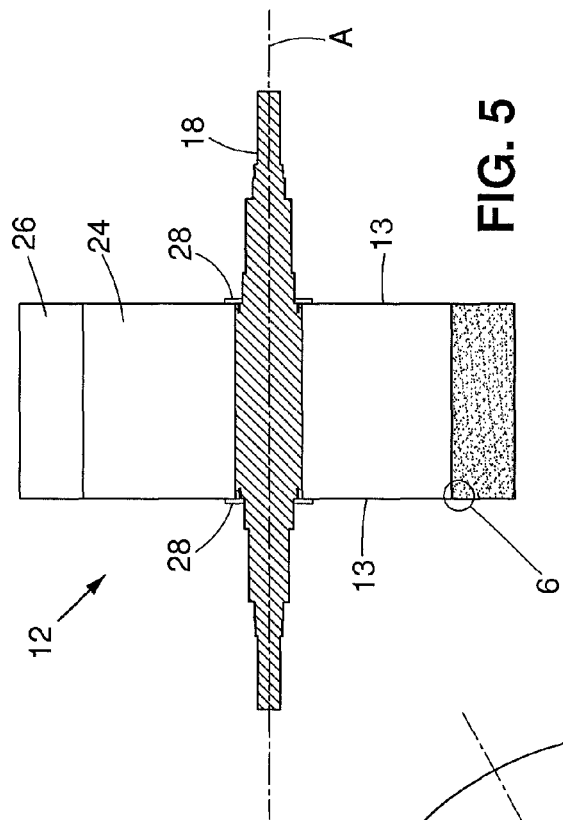
FIG. 5 is a sectional view of the flywheel of FIG. 2.
Figure 4:
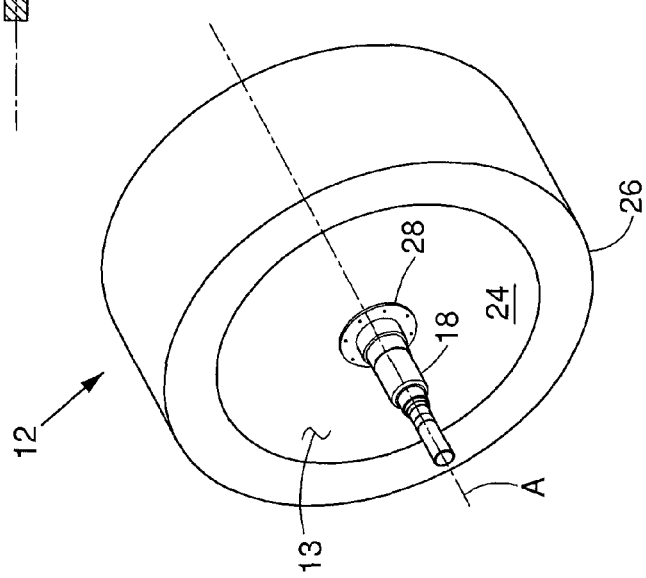
FIG. 4 is a perspective view of the flywheel of FIG. 2.
Figure 10:
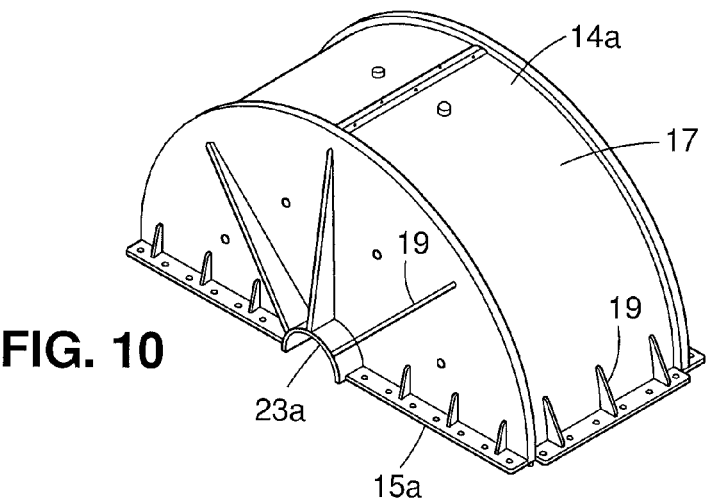
FIG. 10 is a perspective view of an embodiment of one half of a vacuum chamber housing or enclosure in the present invention, such as the upper half.
Figure 11:
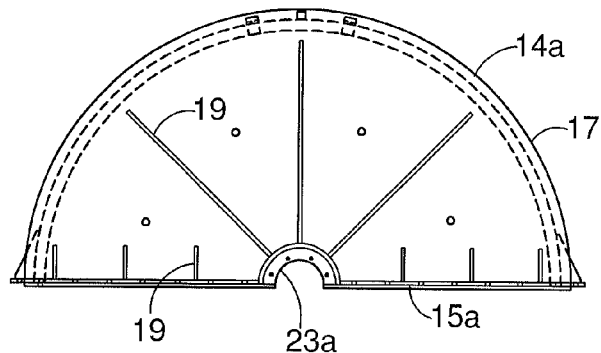
FIG. 11 is a front view of the vacuum chamber half of FIG. 10.
Figure 12:
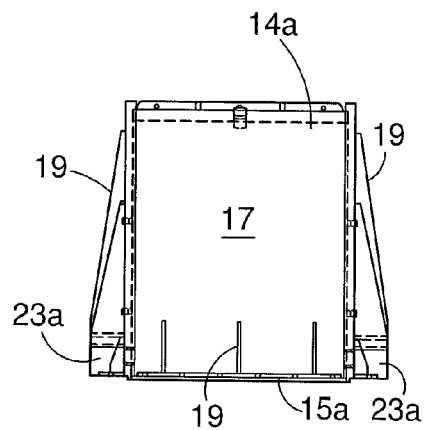
FIG. 12 is a side view of the vacuum chamber half of FIG. 10.
Figure 14:
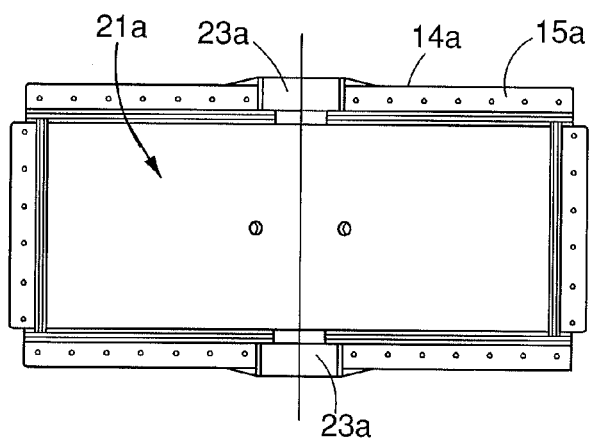
FIG. 14 is a bottom view into the interior of the vacuum chamber half of FIG. 10.
Figure 13:
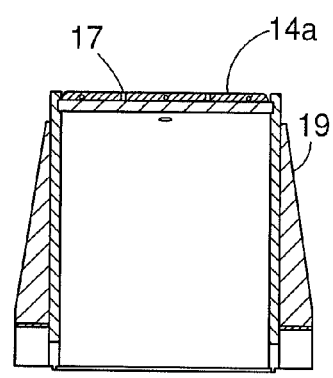
FIG. 13 is a sectional view of the vacuum chamber half of FIG. 10.
Figure 15:
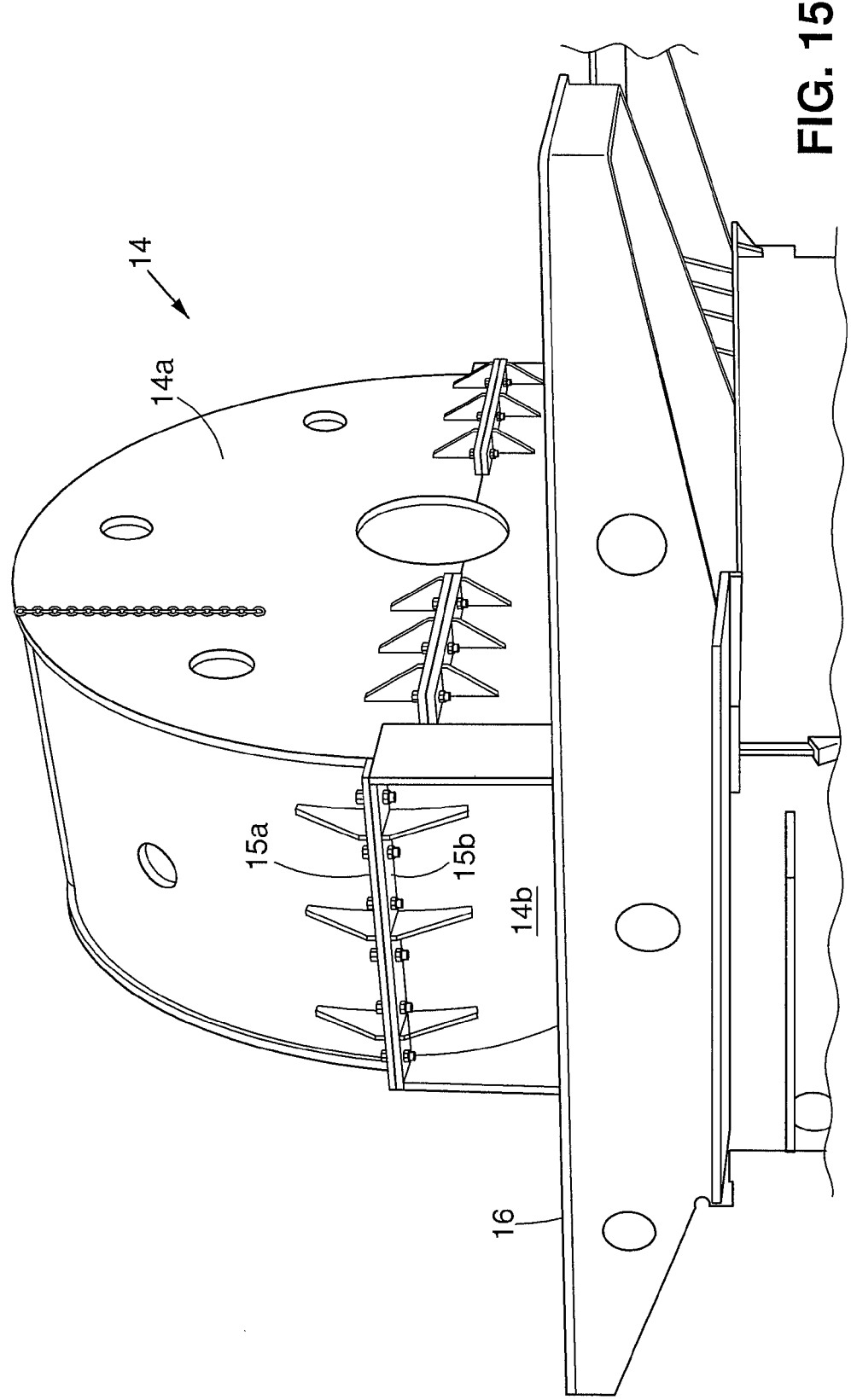
FIG. 15 is a perspective view of an embodiment of a flywheel housing on a support frame.

The outer rim 26 can be formed of a series of, or multiple radial layers of stainless steel material. The stainless steel material can be porous, and mounted or secured to, and wrapped around the core 24, and bonded together with adhesives 34. In some embodiments, the adhesive 34 can be a two part epoxy type adhesive having an epoxy resin that is mixed with an epoxy hardener. In one embodiment, the epoxy resin can have a high viscosity of about 10,000 to 15,000 cP, such as about 13560 cP, the epoxy hardener can have a low viscosity of about 10 to 30 cP, such as about 21 cP, and can be mixed together in about a 78/22 ratio. When mixed, the epoxy can have a syrupy viscosity prior to curing, such as about 590 cP, have a long curing time, such as about 24 to 72 hours, and can have a shear strength of at least about 1000 PSI when cured, which can be 1490 PSI. The epoxy used can be chosen to withstand warm temperatures, such as typically encountered by a flywheel operating in a vacuum enclosure. The stainless steel material in one embodiment can be stainless steel wire rope 30, which for example, can be wound continuously under tension to the desired wheel diameter, and can be ½ inch in diameter, and can be formed of multiple wire strands, fibers or filaments. Referring to FIG. 6, the voids, cavities recesses or spaces 31 within the wire rope 30 between the wire strands, and the voids, cavities, recesses or spaces 33 between radially and laterally adjacent courses of wire rope 30 can be filled and occupied by the adhesive 34. This can continuously bond the individual wire strands in the wire rope 30 together, as well as continuously bond each radially and laterally adjacent course of wire rope 30 together. In some embodiments, if desired, the wire rope 30 can be a single fiber or filament.

The voids 25 within and around the material 24a for core 24, and the voids 31 and 33 within and around the wire rope 30 of the outer rim 26 can be filled with adhesive 34, which can be introduced and impregnated into the core 24 and outer rim 26 under vacuum. Referring to FIGS. 7-15, a flywheel 12 having a core 24 and outer rim 26 without adhesives can be placed within the interior 21 of a vacuum chamber, enclosure or housing that has a dimensionally accurate size and shape of the finished flywheel. The vacuum enclosure can be similar or the same as enclosure 14 of FIG. 1, with appropriate sizing or dimensions, or can be a separate or different enclosure. The vacuum enclosure 14 can have a clamshell construction with an upper portion or half 14a and a lower portion or half 14b, which can be joined or bolted together at flanges 15a and 15b for sealing. Each half 14a and 14b can be generally one half of a disk or cylinder with a half circular outer perimeter of about 180°, which when combined, collectively form a vacuum enclosure 14 that is generally disk or cylindrically shaped. The exterior of each half 14a and 14b can include ribs or gussets 19 for added strength. Each half 14a and 14b has an interior region 21a and 21b which collectively form the interior 21 of vacuum enclosure 14. A sealing flange 23 on each side of the vacuum enclosure 14 can provide sealing around shaft 18. Each sealing flange 23 can have an upper 23a and lower 23b portion associated with halves 14a and 14b which join together.

A vacuum pump 36 can be connected to the vacuum enclosure 14 via a conduit 37 and shut off valve 38, such as at the bottom, and air, water, moisture and gases inside removed, for example, until about 28 to 32 inches of mercury vacuum is achieved. The vacuum pump 36 can be shut down and/or isolated by shut off valve 38. A reservoir 42 of adhesive 34 can be connected to the vacuum enclosure 14 via a conduit 40 and shut off valve 44. The valve 44 can be opened to let the adhesive 34 enter and impregnate the interior of the vacuum enclosure 14, penetrating into and impregnating the core 24 and/or the outer rim 26 of the flywheel 12, filling in the voids 25 within the core 24, and the voids 31 and 33 in the outer rim 26. If desired, the reservoir 42 can include a pump for pumping the adhesive 34, or alternatively, a pump can be connected to reservoir 42 or conduit 40. By having a long curing time, for example about 72 hours, the adhesive 34 has sufficient time to seep into and fill virtually all the voids 25, 31 and 33, while under vacuum impregnation, before curing. Once the adhesive 34 has cooled and set or cured, the impregnated flywheel 12 can be removed from the vacuum enclosure 14. The outer diameter of the flywheel 12 can be machined to be concentric relative to shaft 18 and the two sides 13 can be machined flat. In different embodiments, the position of the conduits 37 and 40 can be reversed, or located in other positions. Additionally, other suitable methods of vacuum impregnation can be performed, as known in the art.

In some embodiments, the flywheel 12 can be about 48 inches in diameter or greater. In one embodiment, the flywheel 12 can be about 120 inches in diameter, about 48 inches wide, and can have a core 24 that is about 90 inches in diameter. It is understood that the width and diameter can be greater or smaller, depending upon the use and situation at hand.

Referring to FIGS. 16-18, three construction methods of forming the outer rim 26 are depicted. The first method shown in FIG. 16 depicts metallic or stainless steel wire rope 30 that is attached to core 24, such as by fasteners, adhesives, glue or resin, and wound continuously under tension. The wire rope 30 can be wound side by side in lateral courses to form each radial course to the desired width, for example 48 inches wide. Enough radial courses are wound until the desired diameter is formed, for example, 120 inches in diameter, where it is secured in place, for example with adhesives, glue or resin. In one embodiment, the core 24 can be 90 inches in diameter and the outer rim 120 inches in diameter, which can form an outer rim 26 that is 15 inches thick in the radial direction, or about ¼ the total radius of flywheel 12.

The second method shown in FIG. 17 depicts the formation of individual, separate or discrete concentric annular rings 46 of metallic or stainless steel mesh 32 around the core 24. Each ring 46 can consist of a length of mesh 32 having ends 32a which can be secured together under tension, for example with a lateral pin 48, one circumference at a time. In other embodiments, other suitable fastening methods can be used, such as stitching or sewing with wire, locking rings, etc. The mesh 32 can be a relatively flat porous woven wire mesh belt, cloth, screen, ribbon, expanded or perforated metal sheet, having voids 31 in the mesh 32 between fibers or members 35 of the mesh 32, and forming voids 33 between each concentric annular ring 46. The first ring 46 can be secured to the core 24, such as with fasteners, adhesives, glue or resin, and subsequent rings 46 then being added. In one embodiment, the mesh 32 can be the desired width W of flywheel 12, for example, 48 inches wide and a sufficient number of rings 46 can be added around a 90 inch diameter core 24 to result in an outer diameter of desired size, for example, 120 inches. In some embodiments, the fibers or members 35 in the mesh 32 of each ring 46 can interlock with fibers or members 35 in the mesh 32 in radially adjacent rings 46. When the adhesive 34 is applied, the adhesive 34 can fill the voids in the mesh 35 between the fibers or members 35, bonding them together, as well as fill the voids 33 for bonding the radial layers of the mesh 32 together.

The third method shown in FIG. 18 depicts a belt of metallic or stainless steel mesh 32 that has been secured to core 24, such as by fasteners, adhesives, glue, or resin, and continuously wound or wrapped in a spiral manner around the core 24 in multiple radial layers under tension until the desired outer diameter is obtained. In some embodiments, the mesh 32 can be the desired width W of flywheel 12, about 48 inches wide, and wound around a 90 inch core 24 until the final desired diameter is obtained, for example, about 120 inches. In some embodiments, the wire rope 30 and mesh 32 can be replaced with flat stainless steel wire braid. In other embodiments, the core 24 can be omitted and the outer rim 26 can be formed around or secured to the shaft 18.

The weight of the flywheel 12 can be at least about 1700 lbs and can commonly have weights of about 5000 lbs, about 10,000 lbs, about 20,000 lbs, about 30,000 lbs, about 40,000 lbs, about 50,000 lbs, about 60,000 lbs and about 70,000 lbs. At rotational speeds over about 1000 RPM, and ranging up to about 10,000 RPM, a large heavy flywheel can commonly fail. However, the present invention can provide a large heavy flywheel 12, having the sizes, weights and rotational speeds previously described. A large diameter (48 inches or greater) flywheel 12 having a heavy mass or weight (1700 lbs and above), can be formed and can be operated at high speeds (1000 RPM and above) by forming the outer rim 26 from stainless steel bounded together in the manner previously described. It has been found that stainless steel can have an increased adhesive bond strength with an adhesive such as epoxy over that of commonly available steel metallic wire, which can enable these large sizes, weights and speeds. For example, the use of stainless steel material can form a stronger surface bond with the adhesive 34 in comparison to a metal such as commonly available steel. Commonly available steel forms oxides or rust on its surface which typically limits the strength of the surface bond with adhesive 34. If the steel is coated with a substance to limit oxidization or rust, such as oil, the coating also typically limits the strength of the surface bond. In contrast, by using stainless steel material, oxides, rust or coatings are typically not present, so that a higher strength surface bond between the surface of the stainless steel material and adhesive 34 can be obtained. If desired, the surface of the stainless steel can be treated to further increase the surface area or form pores or indentations in the surface, for example, by etching, such as with acids or other suitable chemicals. Mechanical surface treating can also be performed, such as with an abrasive material or member. Stainless steel has sufficient strength to be used in a large high speed flywheel 12 and has desired weight characteristics. In addition, by using stainless steel material that is porous and an adhesive 34 that is impregnated into the outer rim 26 under vacuum over an extended or a long period of time, virtually all the voids 31 within the stainless steel material and the voids 33 between the stainless steel material can be filled with adhesive 34, thereby forming or maximizing a high amount of surface area bonding between the adhesive 34 and the stainless steel material. Furthermore, the filling of the voids 31 and 33 can form interlocking regions of adhesive 34, thereby also providing locking of the layers of stainless steel material relative to each other. Consequently, the flywheel 12 is able to withstand the high forces during operation due to one or more of the following, the adhesive can form a strong surface bond with stainless steel material, when the stainless steel material used is porous with a high surface area, the bonding can be over a high or large surface area which maximizes the amount of bonding, and the adhesive can have a shear strength over about 1000 PSI, such as about 1490 PSI.

In addition to the epoxy resin described above, in some embodiments, other types of epoxy resins, can be used, as well as other suitable glues, resins and adhesives, including thermosetting resins. Also, metals or alloys other than stainless steel can be used. For example, common or carbon steel without an oil coating can be employed if measures are taken to compensate for, or prevent rust and corrosion. The common steel can be transported, stored and assembled in a moisture free environment to prevent the formation of rust or corrosion. Furthermore, the surface of the common steel can be surface treated to remove any rust or corrosion prior to assembly into a wheel. Protective rust inhibiting coatings, such as, metallic or oxide coatings can also be employed to prevent rust or corrosion from forming. Steel alloys other than carbon or common steel, such as 4000 series steel, can be used. Also, other metals used can also include titanium or other suitable metals, or alloys.

When carbon or common steel, is cleaned and surface treated to remove oil, rust and/or corrosion, the surface can be made more porous and there can be a stronger initial bond with adhesive 34 than is obtainable with stainless steel. However, over time, there is a chance that the carbon or common steel could later rust or corrode if moisture is absorbed by the adhesive 34, or if the carbon or common steel slowly chemically or galvanically reacts with the adhesive 34, so that the bond of the carbon or common steel with the adhesive 34 can weaken over time. Weakening of flywheel 12 is undesirable in view that a mechanical failure of the flywheel 12 can be catastrophic. However, using stainless steel can reduce, limit or prevent subsequent rusting or corroding after bonding with adhesive 34, since stainless steel is resistant to rusting and corroding from moisture, and is also resistant or does not chemically or galvanically react with many or most adhesives 34. Consequently, stainless steel can have a bond strength with the adhesive 34 that can remain substantially the same or consistent over time. In order to aid or increase the bond strength of the stainless steel with the adhesive 34, a preepoxy primer, such as known in the art, can be applied to the stainless steel to treat or etch the surfaces prior to bonding with adhesive 34.

Figure 19:
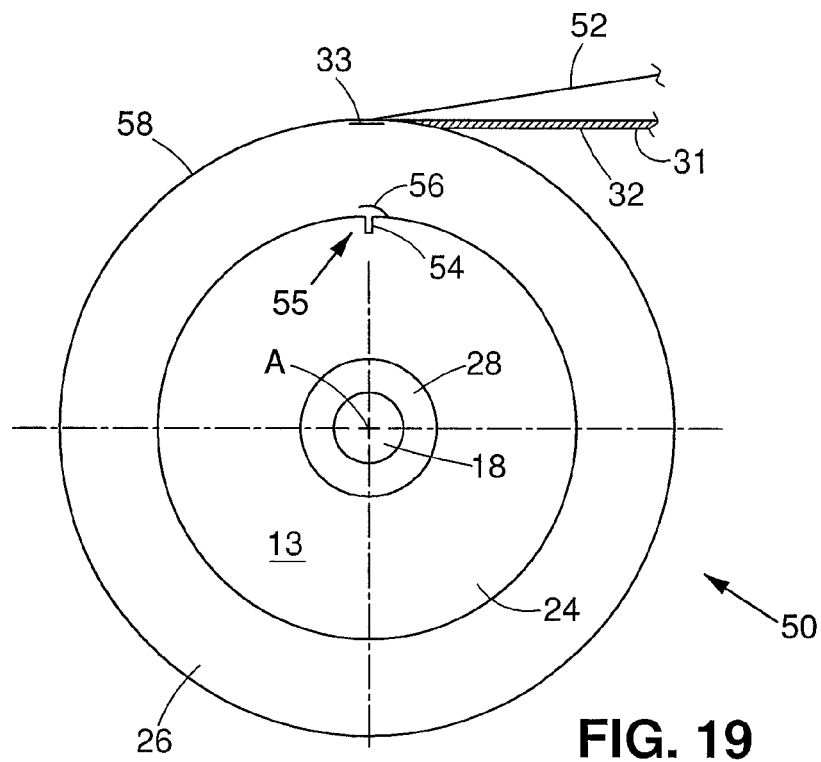
FIG. 19 is a schematic drawing of a process for forming another embodiment of a flywheel in the present invention.
Figure 20:
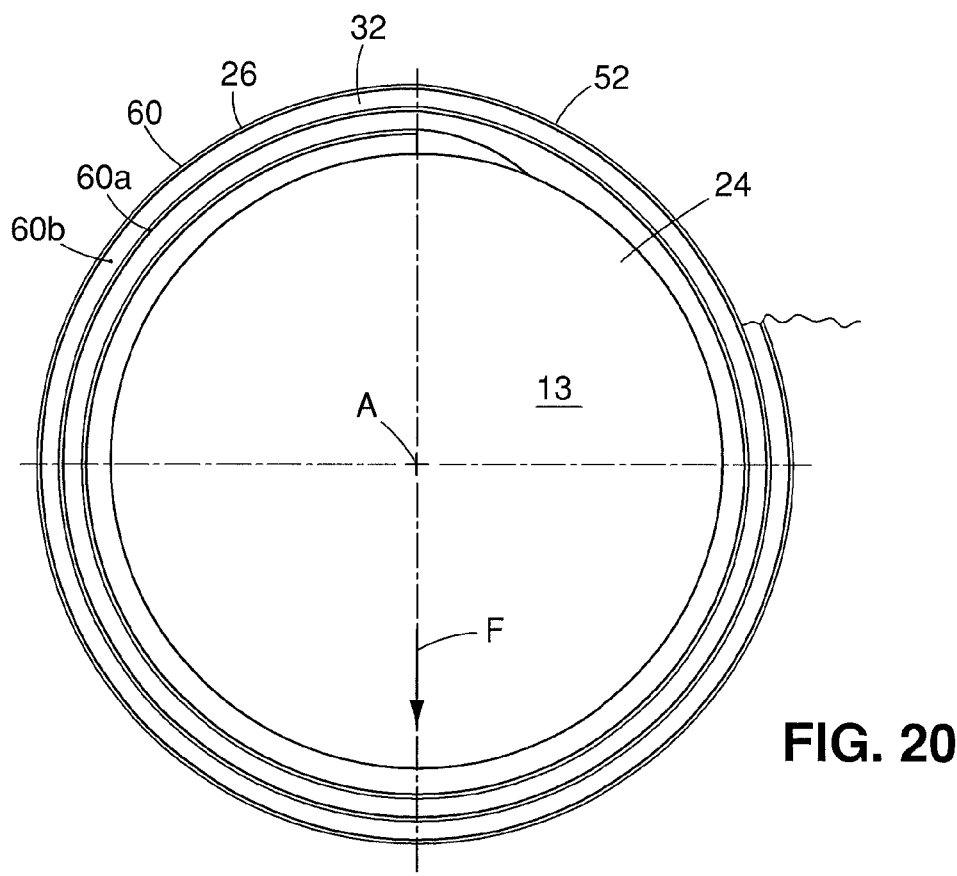
FIG. 20 is a side schematic view of a portion of a flywheel formed by the method of FIG. 19.

Referring to FIGS. 19 and 20, flywheel 50 is another embodiment of a flywheel in the present invention which differs from the flywheel 12 made in the manner of FIG. 18, in that the outer rim 26 can be formed around core 24 with a web of porous stainless steel material or mesh 32 and an interlayer web of porous nonmetallic fiber material or cloth 52, lengths of which are continuously wound around the core 24 to form a bilayer spiral composite wheel structure or configuration 60, having alternating layers of mesh 32 and interlayer 52 (FIG. 21) bonded in adhesive 34. The core 24 can be a metallic core that is machined to be round and concentrically mounted to shaft 18, and can be balanced. Securement members 28 can be used to mount core 24 to shaft 18, but alternatively, other suitable securement members or methods known in the art can be employed, such as with keys, splines, etc. The outer perimeter of the core 24 can have a securement or attachment location, structure or fixture 55 for securing the ends of the mesh 32 and interlayer 52 to the core 24 prior to winding. The securement structure 55 can include one or more slots or holes 54 and/or clamping members 56 to trap, clamp or secure mesh 32 and interlayer 52 to the outer surface of the core 24. The clamping members 56 can be spring loaded, or alternatively, can be tightened with screws or bolts. The webs of mesh 32 and interlayer 52 can have a width W that is about the width of the flywheel 50 and can be wound under tension continuously around core 24 until the desired diameter is obtained. The final outer layer 58 can be the interlayer material 52 so that the mesh 32 can be encapsulated and contained by interlayer 52 and adhesive 34 composite on the circumferential outer perimeter, which typically has the highest stress. The width W of the flywheel 50 can commonly range from 12 to 48 inches, and the outer diameter can commonly range from 36 to 120 inches in diameter. The flywheel 50 can be bonded together with the same adhesive 34 or resin such as epoxy resin, and in the same manner as described for flywheel 12.

The porous nonmetallic interlayer 52 can have a stronger bond with the adhesive 34 than the stainless steel mesh 32 has with the adhesive 34, and the interlayer 52 and adhesive 34 can form a high strength spiral composite structure 60a that is bonded to and continuously spirally encompasses or sandwiches internally and externally, the spiral composite structure 60b formed by the mesh 32 and adhesive 34, thereby forming a bilayer spiral composite wheel structure 60. The interlayer 52 can be a web of woven or nonwoven cloth of suitable materials or fibers such as aramid fibers, carbon fibers, glass fibers and carbon nanotubes. The carbon nanotubes can be considered fibers. When the interlayer 52 is formed of carbon, such as carbon fibers or carbon nanotube paper or cloth, the spiral composite structure 60a can be of higher strength than spiral composite structure 60b, and can create an outer composite rim structure 26 that is stronger than the one in flywheel 12. By being in a bilayer spiral configuration, the mesh 32 in the spiral structure 60b can be continuously adjacently internally and externally supported, bonded to and locked in place by the adjacent sandwiching spiral of composite structure 60a. The spirally composite structure 60a can spirally circumferentially surround the spiraling composite structure 60b on the outer radial side while spirally radially outward and can spirally circumferentially and radially lock the composite structure 60b within a high strength structure. As a result, the spiraling composite structure 60a can continuously spirally contain or resist in a series of integrally connected radial layers, outward centrifugal forces F of each radial layer of mesh 32 in the spirally composite structure 60b, during rotation of flywheel 50.

Figure 21:
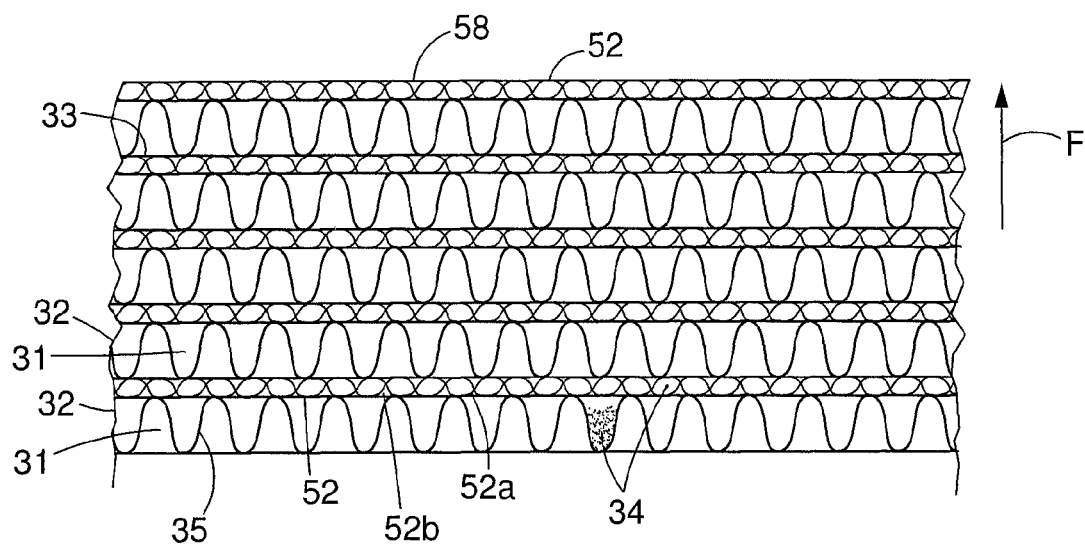
FIG. 21 is a schematic drawing depicting a portion of the layers of the flywheel of FIG. 19.

Referring to FIG. 21, the interlayer 52 can also reduce the size of spaces or voids 33 between the radial layers in the outer rim 26 in comparison to that in flywheel 12, which can also contribute to higher strength, since the adhesive 34 can span across smaller voids. For example, referring to flywheel 12 in FIG. 18, the fibers or members 35 of mesh 32 have cavities, spaces, recesses or voids 31 between the fibers or members 35, and the radial layers of mesh 32 are adjacent to each other. As a result, the spaces or voids 33 between the radial layers of mesh 32 can also extend into the cavities or voids 31 within the mesh 32, thereby increasing the size of the spaces occupied by the adhesive 34. It is possible for a void 31 in one radial layer of mesh 32 to extend into the void 33 between adjacent radial layers of mesh 32 and further into a void 31 in the next radial layer of mesh 32, thereby creating a large or long continuous void. The adhesive 34 occupying a larger or longer void can break or shear more easily than an adhesive occupying a smaller or shorter void. However, in flywheel 50, as seen in FIG. 21, the interlayer 52 can act as a separator, partition or barrier between the adjacent radial layers of mesh 32, separating the radial layers of mesh 32 apart from each other so that voids 31 in the adjacent radial layers of mesh 32 generally do not extend across space or void 33 into the next radial layer of mesh 32. In addition, the interlayer 52 can be much thinner than the layer of mesh 32, so that the cavities, voids, recesses or spaces 52b between the fibers or members 52a of the interlayer 52 can be small or short, and if combined with a void 31 in the radial layer of mesh 32, does not create a much larger or longer combined void than found in the initial void 31. As a result, the adhesive 34 can occupy smaller or shorter voids 31, 33 and 52b, and have higher resistance against shear forces. In some embodiments, the fibers or members 32a and 52a of adjacent radial layers of mesh 32 and interlayer 52, can experience some interlocking for providing mechanical locking and further strength.

In some embodiments, the stainless steel mesh 32 can be about ⅜ inches thick, and can range from about ⅛ to about ½ inches thick, and the interlayer 52 can be about 1/32 to 1/16 inches thick, and range from about 1/64 to about ⅛ inches thick. The number of radial layers of the mesh 32 and the interlayer 52 depend on the thickness of outer rim 26, as well as the thickness of the the mesh 32 and the interlayer 52. For example, for embodiments of the outer rim 26 having a thickness that is about ¼ the total radius, in a flywheel 50 that is 36 inches in diameter, the outer rim 26 can be about 4.5 inches thick in the radial direction, and can have as little as 8 radial layers, each of mesh 32 and interlayer 52 (total of 16), or as many as 32 radial layers each (total of 64). In a flywheel 50 that is 48 inches in diameter, the outer rim 26 can be about 6 inches thick in the radial direction, and can have as little as 10 radial layers each (total of 20), or as many as 42 radial layers each (total of 84). In a flywheel 50 that is 72 inches in diameter, the outer rim 26 can be about 9 inches thick in the radial direction, and can have as little as 15 radial layers each (total of 30), or as many as 64 radial layers each (total of 128). In a flywheel 50 that is 120 inches in diameter, the outer rim 26 can be about 15 inches thick in the radial direction, and can have as little as 24 radial layers each (total of 48), or as many as 107 radial layers each (total of 214). It is understood that the diameter of flywheel 50, the radial thickness of the outer rim and the thickness of the mesh 32 and interlayer 52 can vary, depending upon the situation, so that the number of radial layers of mesh 32 and interlayer 52 can vary by a large degree. The mesh 32 in addition to having configurations or other counterparts as previously described for flywheel 12, can also included nonwoven porous stainless steel fiber material and chain link or mail. The interlayer 52 can include woven and nonwoven fibers or members 52a formed into a porous material configuration, cloth or paper (thin cloth can be considered paper), and is most often formed of carbon fibers or carbon nanotubes for high strength. Although a steel alloy such as stainless steel mesh 32 is preferred, other corrosive resistant steel alloys can be employed, such as molybdenum steel, which can be heavier than stainless steel. In addition, 4000 series steel can be used, which is not as corrosion resistant but can be more cost effective, or titanium can be used. Furthermore, in some embodiments, flywheel 50 can be made employing the process depicted in FIG. 17, where concentric annular rings of mesh 32 and interlayer 52 are formed and assembled around core 24. The use of mesh 32 and interlayer 52 formed around a concentric or round core 24, having a width W that is about the width of the flywheel 50, can result in a wheel that is generally easy to balance.

While this invention has been particularly shown and described with references to example embodiments thereof, it will be understood by those skilled in the art that various changes in form and details may be made therein without departing from the scope of the invention encompassed by the appended claims.

For example, it is understood that the dimensions, weight and rotational speed of the flywheels described can vary, depending upon the situation at hand.

What is claimed is:

1. A flywheel comprising:
 a wheel having a width W, and a composite rim bilayer spiral structure comprising multiple radial layers of porous steel web material and multiple radial layers of porous nonmetallic fiber partition web material, each having about the width W, spiraled around a central axis of the wheel, forming alternating radially adjacent layers of porous steel web material and porous nonmetallic fiber partition web material, the radial layers of the porous steel web material having cavities therein and are separated from each other by the radial layers of the porous nonmetallic fiber partition web material in a sandwiching spiraling manner; and an adhesive bonding the sandwiching spiraling radial layers of porous steel web material and porous nonmetallic fiber partition web material together, the spiraling layers of the porous steel web material being continuously radially adjacently bonded to adjacent higher strength composite spiraling layers of the porous nonmetallic fiber partition web material and spirally locked together.

2. The flywheel of claim 1 in which the porous steel web material and the porous nonmetallic fiber partition web material are wound from continuous lengths into the bilayer spiral configuration.

3. The flywheel of claim 2 in which the porous steel web material is formed from alloy steel.

4. The flywheel of claim 3 in which the alloy steel is stainless steel.

5. The flywheel of claim 4 in which the stainless steel comprises stainless steel fibers.

6. The flywheel of claim 5 in which epoxy adhesive is vacuum impregnated into spaces between the stainless steel fibers and radial layers of the stainless steel web material.

7. The flywheel of claim 6 in which the stainless steel web material comprises a web of stainless steel mesh.

8. The flywheel of claim 3 in which the porous nonmetallic fiber partition web material is formed of carbon.

9. The flywheel of claim 1 in which the porous steel web material is in mesh form and the porous nonmetallic fiber partition web material is in cloth form.

10. The flywheel of claim 1 further comprising a metallic core member having an outer perimeter around which the composite rim structure is positioned.

11. The flywheel of claim 10 further comprising a central shaft on which the core member is mounted.

12. The flywheel of claim 1 in which surfaces of the steel are treated to remove at least one of rust and oil.

13. The flywheel of claim 1 in which surfaces of the steel are treated to increase surface area for bonding with the adhesive.

14. The flywheel of claim 1 in which surfaces of the steel are treated with a rust inhibiting protective coating.

* * * * *